(12) United States Patent
Blersch et al.

(10) Patent No.: US 12,098,770 B2
(45) Date of Patent: Sep. 24, 2024

(54) SEAL AND HOUSING HAVING A SEAL

(71) Applicant: Reinz-Dichtungs-GmbH, Neu-Ulm (DE)

(72) Inventors: Robert Blersch, Mietingen (DE);
Manuel Kamm, Buch (DE); Andreas Michalke, Ulm (DE); Jochen Salzmann, Neu-Ulm (DE); Maxim Vovcuk, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 57 days.

(21) Appl. No.: 17/374,791

(22) Filed: Jul. 13, 2021

(65) Prior Publication Data
US 2022/0018438 A1 Jan. 20, 2022

(30) Foreign Application Priority Data
Jul. 14, 2020 (DE) .................. 20 2020 104 066.9

(51) Int. Cl.
*F16J 15/10* (2006.01)
(52) U.S. Cl.
CPC ................. *F16J 15/104* (2013.01)
(58) Field of Classification Search
CPC ............. F16J 15/104; F16J 15/106
See application file for complete search history.

(56) References Cited

U.S. PATENT DOCUMENTS

| | | | | |
|---|---|---|---|---|
| 3,342,501 A * | 9/1967 | Meyer | ............... | B29C 45/14344 277/639 |
| 3,720,420 A * | 3/1973 | Jelinek | .................. | F16J 15/104 277/611 |
| 5,024,863 A * | 6/1991 | Gibbon | .................. | C08J 7/0427 264/129 |
| 6,669,205 B2 * | 12/2003 | Schenk | .................. | F16J 15/127 277/630 |
| 11,621,453 B2 * | 4/2023 | Ruopp | .................. | F16J 15/122 429/185 |
| 2005/0046121 A1 * | 3/2005 | Jones | ..................... | F16J 15/122 277/594 |
| 2006/0290073 A1 * | 12/2006 | Peterson | ................ | F16J 15/121 277/591 |
| 2010/0143076 A1 * | 6/2010 | Matsumoto | ............ | F16J 15/104 411/533 |
| 2011/0140374 A1 * | 6/2011 | Dubiel | .................. | F16J 15/061 277/628 |

(Continued)

FOREIGN PATENT DOCUMENTS

| JP | 10077464 A * | 3/1998 | ............. F16J 15/104 |
|---|---|---|---|
| WO | WO2011083595 A1 * | 7/2011 | ............. F16J 15/067 |
| WO | WO-2019211303 A1 * | 11/2019 | ............. F16J 15/061 |

*Primary Examiner* — Eugene G Byrd
(74) *Attorney, Agent, or Firm* — McCoy Russell LLP

(57) ABSTRACT

The present disclosure relates to a seal, such as a gasket, for sealing a gap in a housing, said gap extending around an inner chamber of the housing, and thus for sealing the inner chamber from an exterior of the housing, comprising at least one sealing layer. The present disclosure further relates to a frame seal that provides sealing between at least two components of the housing, for example a bottom part and a top part of the housing, for example of a motor vehicle battery housing or motor vehicle battery box housing.

20 Claims, 10 Drawing Sheets

(56) References Cited

U.S. PATENT DOCUMENTS

| | | | |
|---|---|---|---|
| 2012/0187638 A1* | 7/2012 | Bauer | F16J 15/108 |
| | | | 264/261 |
| 2017/0074401 A1* | 3/2017 | Saxton | F16J 15/022 |
| 2017/0321831 A1* | 11/2017 | Nahrwold | F16L 23/18 |
| 2019/0024796 A1* | 1/2019 | Amano | F16J 15/102 |
| 2019/0078687 A1* | 3/2019 | Takeuchi | F16L 23/18 |
| 2019/0128364 A1* | 5/2019 | Kim | F16H 57/025 |
| 2019/0162307 A1* | 5/2019 | Kamm | F16J 15/0818 |
| 2019/0293180 A1* | 9/2019 | Oricchio, Jr. | F16J 15/104 |
| 2020/0277115 A1* | 9/2020 | Mithani | F16J 15/064 |
| 2020/0286694 A1* | 9/2020 | Motoki | F16J 15/062 |
| 2020/0386313 A1* | 12/2020 | Hwang | F16J 15/0818 |
| 2021/0143502 A1* | 5/2021 | Yanagi | H01M 10/0413 |
| 2021/0180697 A1* | 6/2021 | Chiproot | F16J 15/027 |
| 2021/0396316 A1* | 12/2021 | Hagiwara | F16J 15/122 |
| 2021/0404556 A1* | 12/2021 | Hagiwara | F16J 15/064 |
| 2022/0209627 A1* | 6/2022 | Vuong | H02K 5/203 |

* cited by examiner

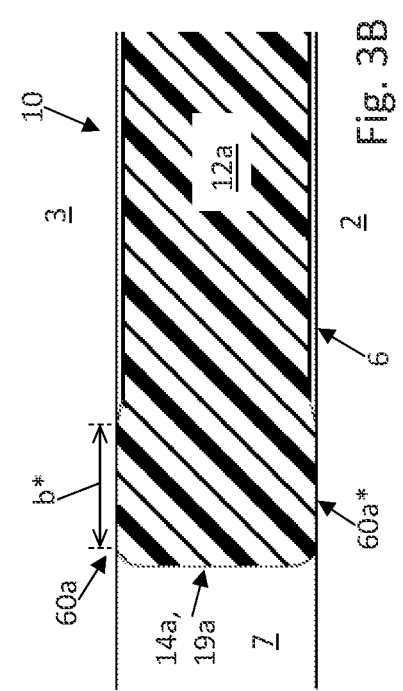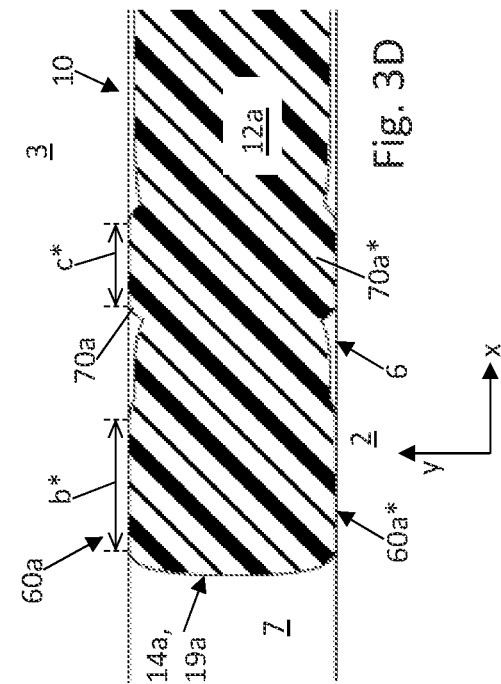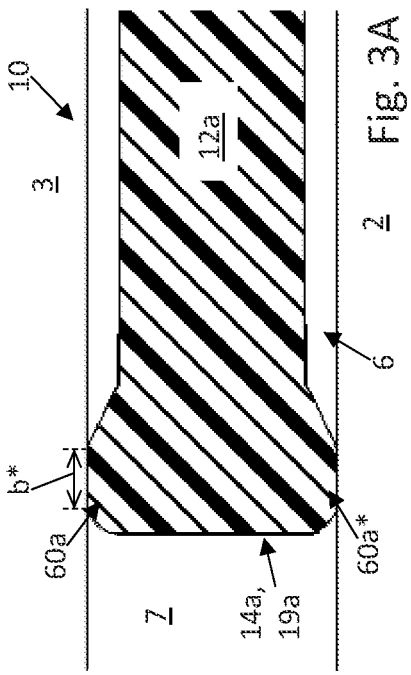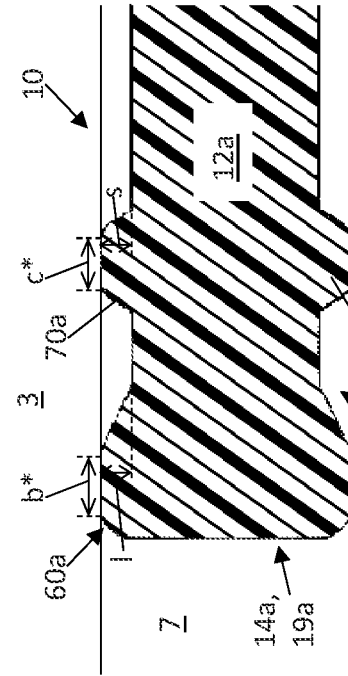

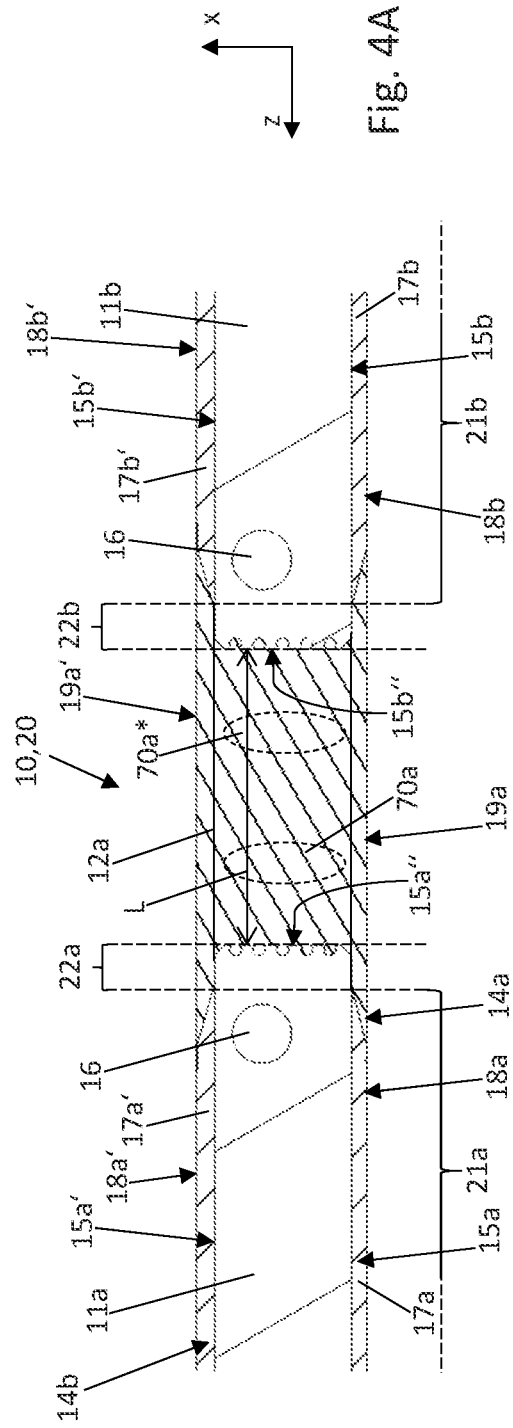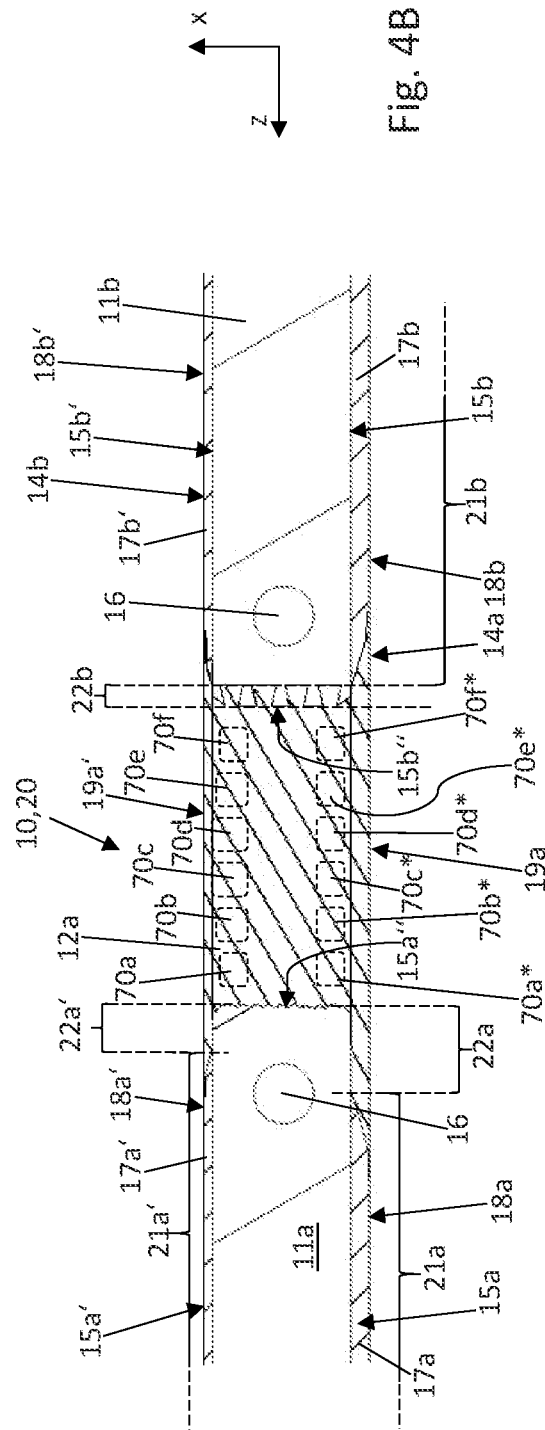

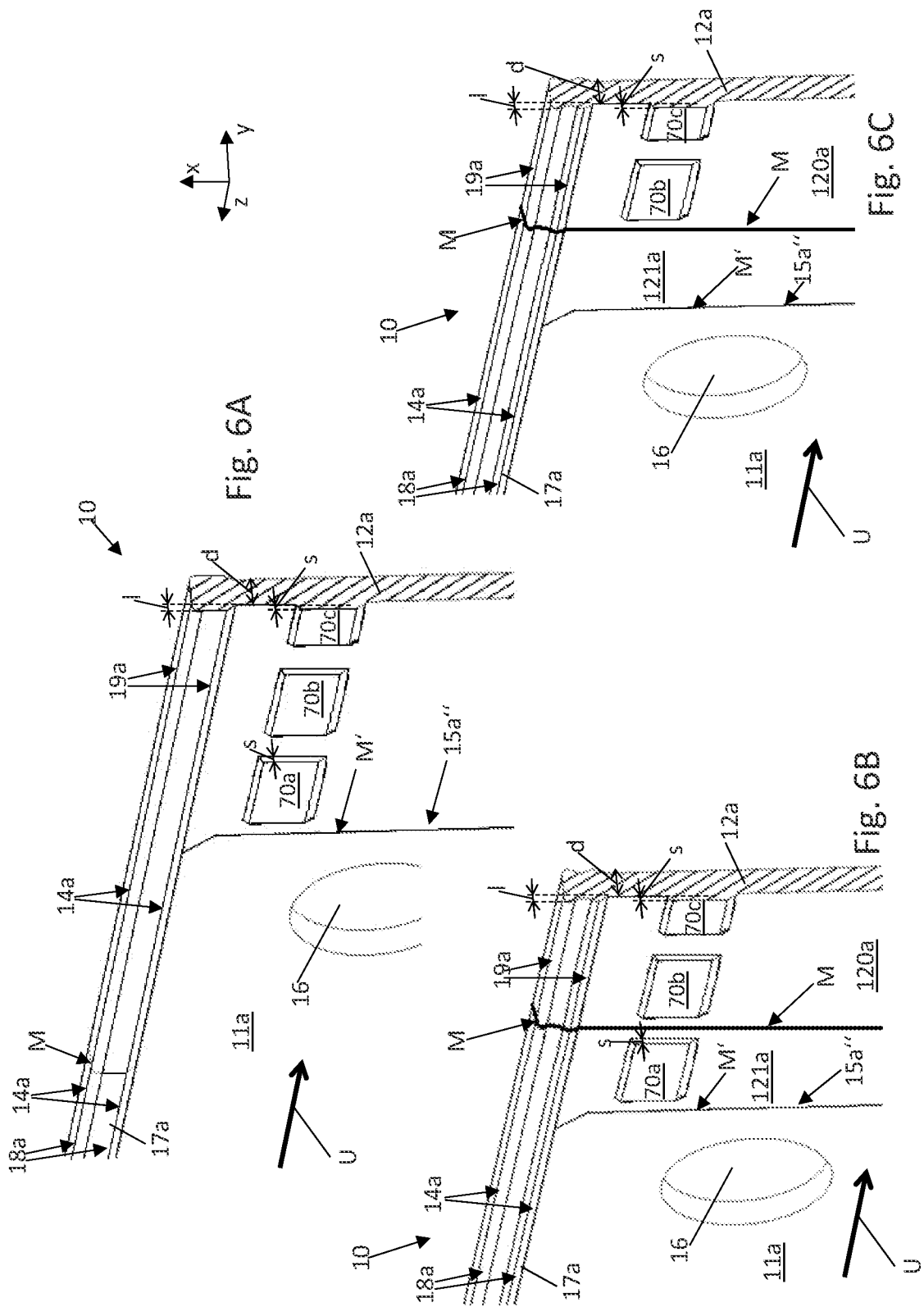

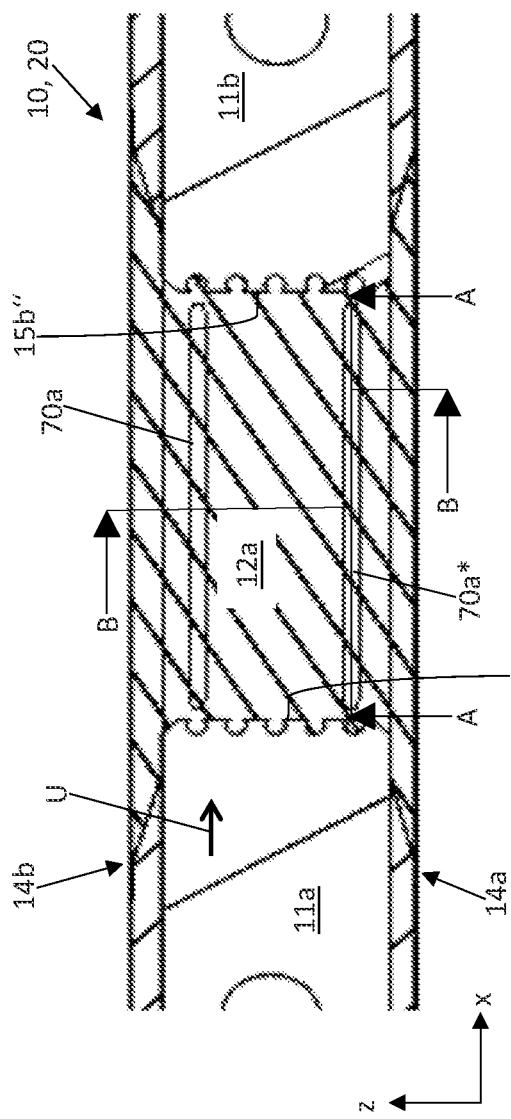

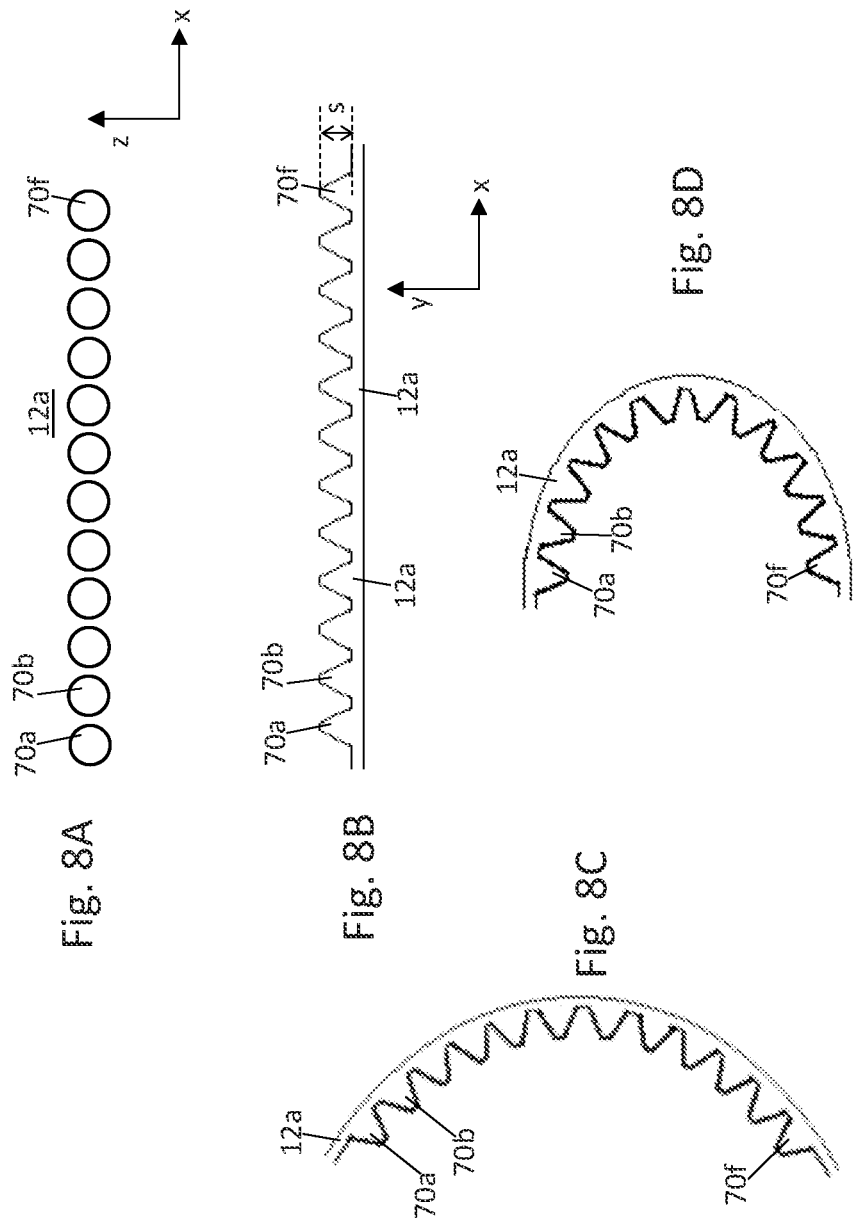

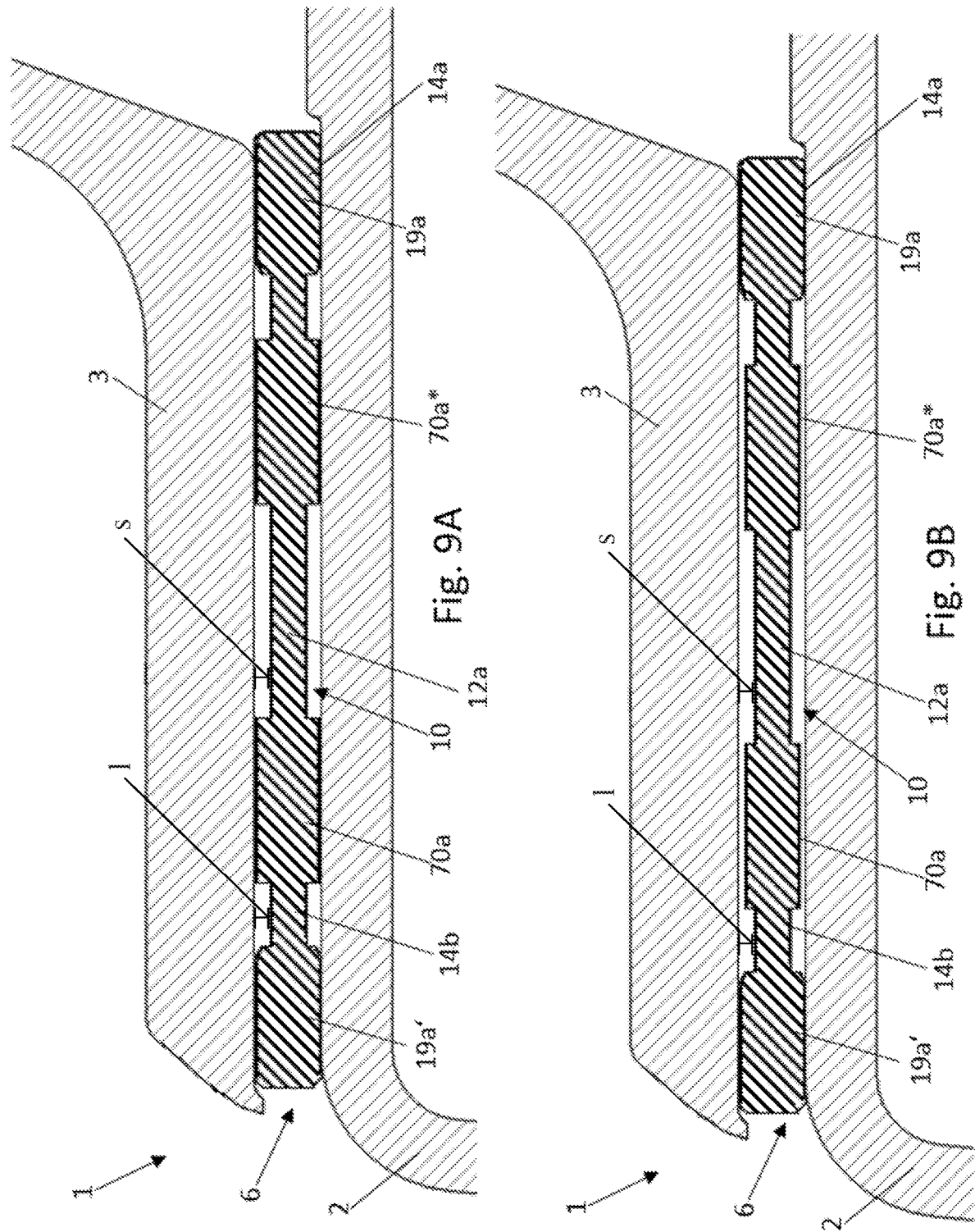

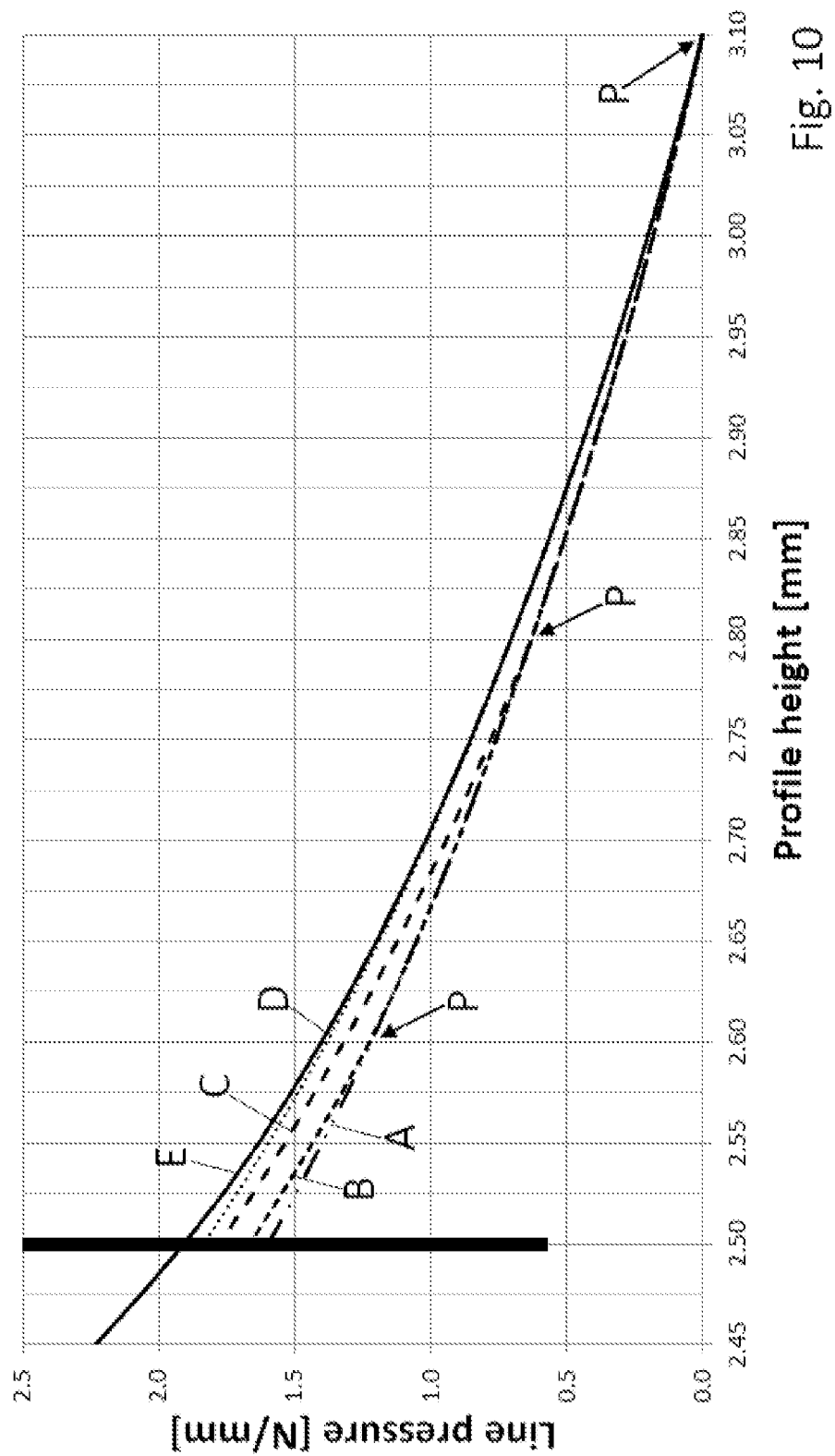

SEAL AND HOUSING HAVING A SEAL

CROSS-REFERENCE TO RELATED APPLICATION

The present application claims priority to German Utility Model Application Serial No. 20 2020 104 066.9, entitled "SEAL AND HOUSING HAVING A SEAL," and filed on Jul. 14, 2020. The entire contents of the above-listed application are hereby incorporated by reference for all purposes.

TECHNICAL FIELD

The present disclosure relates to a seal, such as a gasket, for sealing a gap in a housing, said gap extending around an inner chamber of the housing, and thus for sealing the inner chamber from an exterior of the housing, comprising at least one sealing layer. The present disclosure further relates to a frame seal that provides sealing between at least two components of the housing, for example a bottom part and a top part of the housing, for example of a motor vehicle battery housing or motor vehicle battery box housing.

BACKGROUND AND SUMMARY

Conventionally, an all-round gap in a housing, between a bottom part and a top part of the housing, for example a battery box trough and a battery box lid of a battery box, is sealed by gluing the top part to the bottom part in the gap. However, this is disadvantageous in that the housing is difficult to dismantle again and then re-assemble in a tight manner. Alternatively, therefore, seals are also placed in the gap all the way around the rim of the bottom part before the lid is releasably fastened, for example screwed on. For this purpose, all-round elastomer seals are often used. The drawback of these is that, due to the flexibility and deformability of the seal as a whole, the assembly is not very secure or greater assembly work is required since, for example, a corresponding groove for the elastomer seal has to be milled or cast in the housing.

Moreover, housings like those of battery boxes often have large dimensions, such that the bottom part closed by the top part has a length and/or width of more than one meter. For example, battery boxes for traction batteries in the vehicle are typically given dimensions of more than 1.3 m in length and more than 0.8 m in width.

In this case, therefore, pure elastomer seals are disadvantageous in that they can be incorrectly positioned or may slip, meaning the assembly is not very secure. On the other hand, conventional single-part frame seals comprising a continuous metal or plastic carrier on which a rubber sealing lip is moulded as a sealing contour are difficult to manufacture in the required dimensions. To manufacture the carrier, very large moulds are required in this case. There are large amounts of material rejects too. Transport and assembly are also complex.

An object of the present disclosure is to provide an improved seal for sealing housings that overcomes the aforementioned disadvantages.

The present disclosure relates to a seal, such as a gasket, for sealing a gap in a housing and thus for sealing an inner chamber of the housing from an exterior of the housing. A gap of this kind can, for example, be the all-round gap between a trough and a lid of the housing, for example of a battery box. When used as intended, a seal as described below is arranged in the gap, for example between the trough and the lid of the housing, or all the way around along the gap between said two parts.

Therefore, and as will be described in more detail below, the seal may comprise an opening that largely corresponds to the dimensions of the inner chamber of the housing in the plane of the seal and is largely or entirely enclosed by the seal. The term "largely" can thus be understood as meaning at least in part, for example to a large degree, mostly, or entirely. The opening can also be referred to as an aperture and/or a cut-out. The seal or gasket thus serves to seal the gap extending around the inner chamber of the housing, by means of at least one sealing layer.

The sealing layer, which may be a planar sealing layer, comprises at least two rigid sealing layer portions, which are interconnected by a sealing layer portion that, unlike the rigid sealing layer portions, is flexible. In this case, the rigid sealing layer portions may each comprise a corresponding rigid carrier element, which is for example a metal carrier element. In such embodiments, the carrier elements can in this case be produced so as to comprise or be made of aluminum or so as to comprise or be made of a steel material. The flexible sealing layer portion comprises or consists of, at least in part, i.e. in part or entirely, an elastomer.

The sealing layer also comprises at least one sealing contour, for example having one or more respective sealing lips, which extends continuously over the different sealing layer portions. In this case, the continuous sealing contour can be composed of different sealing contour portions—partial sealing contours that are produced in different production steps and/or using different materials. For example, in the region of the rigid sealing layer portions, the sealing contour can be produced having a soft component that provides sealing at the relevant support element, and having the above-mentioned elastomer in the region of the flexible sealing layer portion. In the process, the sealing soft component can likewise comprise or consist of, at least in part, the elastomer or a different elastomer.

The uninterrupted sealing contour is formed by the relevant partial sealing contours merging into one another in the different sealing layer portions. It may be advantageous if the partial sealing contours merge into one another substantially seamlessly. As a result, at least one uninterrupted sealing contour can be provided along the sealing layer, said contour extending over both the rigid sealing layer portions and the at least one flexible sealing layer portion connecting the rigid sealing layer portions, such that both the rigid sealing layer portions comprising the associated sealing soft components and the flexible sealing layer portion comprising the elastomer provide an uninterrupted sealing action by way of the respective partial sealing contours.

This embodiment has the advantage that the rigid sealing layer portions of the seal can be connected via at least one connecting flexible sealing layer portion, so that even large-format seals, which can have length by width dimensions of more than 1.3 m×0.8 m or more than 2 m×1 m, can be produced more easily since the respective rigid sealing layer portions can be produced separately in a first step, and in a second step can be connected by the connecting flexible component, namely at least one connecting flexible sealing layer portion. In this case, the second step may, with respect to the manufacturing of a flexible sealing layer portion, be divided into several sub-steps, which may in part also be combined with the first step, and further need not be carried out simultaneously for all the connecting flexible components that are present; rather, it may also take place sequentially for the different connecting flexible sealing layer portions.

In certain embodiments, the number of rigid sealing layer portions may correspond to the number of flexible sealing layer portions connecting the rigid sealing layer portions and, as a whole, rigid and flexible sealing layer portions form a self-contained seal having a self-contained sealing contour, which can have an annular, rectangular or similar shape and extends continuously around the opening. By combining rigid and flexible sealing layer portions, the respective advantages are combined in this case, namely robustness, reliable sealing action and simple assembly on the one hand, and simple manufacture on the other hand.

The flexible sealing layer portion has at least two support elements, in the region of which a thickness of the flexible sealing layer portion, measured perpendicularly to a main extension plane of the seal, is greater than in a respective area around the support elements. The support elements are arranged such that, when the seal is used as intended, the at least one sealing contour in the flexible sealing layer portion is arranged between the support elements and the inner chamber and/or between the support elements and the exterior. In the case of multiple sealing contours, for example a sealing contour facing towards the inner chamber and a sealing contour facing towards the exterior, the support elements can thus be assigned in each case to the nearest sealing contour. Alternatively, however, one support element can also be assigned to both sealing contours, for example if one support element is at the same distance from both sealing contours. The rigid sealing layer portions may be free of support elements. The support elements are thus usually not arranged in the vicinity of through-openings, for example for fasteners or positioning openings.

The arrangement has an advantage that the at least one sealing contour is supported and stabilized by the support elements in the region of the flexible sealing layer portion, so that a sealing performance of the sealing contour in the region of the flexible sealing layer portion is made equal to or at least brought close to the sealing performance of the sealing contour in the region of the rigid sealing layer portions. This is because it has been found that, by providing the additional support elements, it is possible both to counteract a local shifting of the sealing contour in the region of the flexible sealing layer portion in the main extension plane of the seal and to make the effective sealing width of the sealing contour, which is defined by the surface area with which the sealing contour bears against a closely adjacent housing part when compressed as intended, equal to the corresponding effective sealing surface area of the sealing contour in the region of the rigid sealing layer portions; otherwise, it is usually at least slightly smaller due to the softer material in the flexible sealing layer portion. This improves the reliability of the sealing performance for large, easy-to-produce seals.

In one advantageous embodiment, it is provided that in each case two rigid sealing layer portions are foldably or bendably interconnected by the one or a flexible sealing layer portion. This has the advantage that the seal can be folded at the connecting flexible component(s), the flexible sealing layer portion(s), so that large-format seals, which can have length by width dimensions of more than 1.3 m×0.8 m or more than 2 m×1 m, can more easily be transported, installed or removed in the folded state. The logistics are simplified due to the reduced transport volume in the folded state. Standard containers can be used, and the amount of packaging can usually also be reduced. Damage during transport can thus also be avoided. Furthermore, the necessary space to be provided during installation and optionally also during removal is reduced.

When folding or bending, the flexible sealing layer portion is typically bent along a radius (which also varies); in the process, it may describe almost a full circle such that the associated rigid sealing layer portions, optionally with their respective carrier elements, come to rest on one another in a planar manner over a major part of their adjoining surfaces. Alternatively, they may lie on top of each other in an area spaced from the folding or bending point, and in the remaining area facing the folding or bending point, they may move away from each other at a very acute angle in the direction of the folding or bending point. The seal can accordingly be referred to as a bendable or foldable seal. The support elements can be advantageous here, since the length of the flexible sealing layer portion, compared to a seal without such support elements, can thus be selected to be larger along a periphery direction of the seal in the main extension plane, without adversely affecting the sealing performance. An improved distribution of the bending forces also in the sealing contours during the bending or folding is thus achieved, with a resulting greater durability and longer-lasting sealing performance. Buckling is avoided during the folding.

In a further advantageous embodiment, it is provided that at least two sealing contours are present, which in each case extend continuously over the different sealing layer portions. In such an embodiment, the sealing contours may extend along the respective edges of the sealing layer and can thus be assigned to the respective edges or accordingly to the inner chamber and the exterior. The sealing contours may extend in a substantially parallel manner. At least one of the at least two support elements can be assigned to each of the sealing contours and thus can have a supporting effect for in each case one sealing contour, namely for the associated sealing contour. The support elements may each be assigned to the closely adjacent sealing contour. Each sealing contour can thus also be assigned just one support element in order to achieve the appropriate supporting effect. Especially if a support element assigned to just one sealing contour extends along the sealing contour, the sealing performance of the sealing contour can already be significantly improved by using a small number of support elements, and yet flexibility in the flexible sealing layer portion can be retained. It is also possible to assign appropriate support elements to two sealing contours, substantially at half the distance therebetween, which support elements then have a supporting effect for both sealing contours.

In another advantageous embodiment, it is provided that the support elements and/or the at least one sealing contour in the region of the flexible sealing layer portion can be formed in one piece with at least part of the flexible sealing layer portion, for example part of the flexible sealing layer portion or the entire flexible sealing layer portion. The support elements and/or the sealing contour and the flexible sealing layer portion may be produced so as to comprise or be made of an elastomer. This enables simple manufacture, in which the described advantages are also achieved. If the flexible sealing layer portion comprises or consists of several portions in the periphery direction of the seal, support elements may be present at least in the middle portion or portions.

In yet another advantageous embodiment, it is provided that a height of the support elements, measured perpendicularly to the main extension plane of the seal and compared to an area around the support elements, can be at least 45%, at least 75%, at least 95%, substantially 100%, or exactly 100% of the height of the sealing contour. The height can thus also be regarded as the thickness of the sealing layer in the region of the support elements minus the thickness of the sealing layer in the region of the area around the support elements. The height of the support elements may protrude equally beyond the two surfaces of the flexible sealing layer portion in question. The height of the sealing contour can be determined analogously to the height of the support elements. The described ranges for the height of the support elements have proven to be advantageous in this embodiment, since the effective line pressure achieved on the sealing contour of the flexible sealing layer portion is not linearly related to the height of the support elements.

It is provided that, as the height increases, the support elements in each case taper at least slightly or considerably in a sectional plane perpendicular to the main extension plane of the seal, which may extend parallel to at least one sealing contour. While a slight tapering brings advantages from a manufacturing point of view, a considerable tapering also facilitates the bending or folding of the seal in the flexible sealing layer portion by the support elements, since the support elements, during bending, do not butt laterally against one another until a relatively small bending radius is reached. This can be advantageous when the support elements are arranged in at least one row, as will be described below.

Specifically, it is provided in another advantageous embodiment that the support elements can be arranged in at least one row, which may extend adjacent to at least one sealing contour, which may be the associated sealing contour and therefore generally the nearest sealing contour. In this case, the row may advantageously extend along or parallel to the sealing contour. One or two or four rows which each contain a plurality of support elements are advantageous, each row being assigned to one of two sealing contours. In the case of four rows, two rows can be arranged on each side of the flexible sealing layer portion, for example one protruding from each individual surface, respectively. As a result, the desired stabilization of the sealing contour in the region of the flexible sealing layer portion can take place without adversely affecting other properties, such as bendability or flexibility with the flexible sealing layer portion and the ease of production.

In another advantageous embodiment, it is provided that the support elements can be configured to be stiffer than the sealing contour in a direction perpendicular to the course of the sealing contour, which may be in the main extension plane. This can be achieved by a width of the support elements, measured perpendicularly to the thickness and the course of the sealing contour, which is greater than the width of the sealing contour. However, it can also be achieved for example by a reinforcement made of a different material than the elastomer, for example in the form of a core, which may be made of a different elastomer or some other plastics material, which can be incorporated in the flexible sealing layer portion in the region of the respective support element. A core of the support element may have a firmer component compared to the rest of the support element, for instance compared to an edge layer of the support element, and may thus form a reinforcement. This has the advantage that the sealing contour is reliably supported.

In another advantageous embodiment, it is provided that the support elements may each have an inhomogeneous distribution of the height, measured perpendicularly to the main extension plane of the seal, and/or of the width, measured in the main extension plane of the seal transversely to the course of the sealing contour, and/or of a length, measured in the main extension plane of the seal along the course of the sealing contour, and/or of a distance from the respective closely adjacent support element, measured in the main extension plane of the seal along the course of the sealing contour, and/or of a distance from a sealing contour, measured in the main extension plane of the seal transversely, or perpendicularly, to the course of said sealing contour. The seal can have a plurality of support elements, for example at least three or more support elements. The inhomogeneous distribution, or different values for height and/or width and/or length and/or at least one distance, the supporting effect of the support elements and also other properties, such as for example a flexibility of the flexible sealing layer portion, can be continuously or quasi-continuously adapted along the course of the flexible sealing layer portion and thus can be adapted to the individual requirements of the respective seal or the respective specific material properties. As a result, the advantages of combining rigid and flexible sealing layer portions in a seal can again be individually adapted, and the sealing performance of the seal can be optimized. Alternatively, however, it is also possible to configure all the support elements substantially identically. This may then correspond to identical distributions.

One aspect also relates to a housing, for example a motor vehicle battery housing or a motor vehicle battery box housing, having a seal according to one of the described embodiments.

Another aspect also relates to a method for producing a seal for sealing an inner chamber of a housing, comprising at least one sealing layer that has at least two rigid sealing layer portions, which are interconnected by a flexible sealing layer portion, and at least one sealing contour, which extends continuously over the different sealing layer portions. In this case, the flexible sealing layer portion is produced with at least two support elements, for example by injection moulding an elastomer, wherein, in the region of the support elements, a thickness of the flexible sealing layer portion, measured perpendicularly to the main extension plane of the seal, is greater than in a respective area around the support elements, wherein the support elements are arranged such that, when the seal is used as intended, the sealing contour in the flexible sealing layer portion is arranged between the support elements and the inner chamber and/or between the support elements and the exterior. The support elements can in this case be produced in the same method step as the associated flexible sealing layer portion, or in the same method step as the adjacent sealing contour(s). In one variant, two rigid sealing layer portions, which may have previously been punched, optionally embossed, and provided with at least one sealing contour of their own by injection moulding, are connected by injecting moulding the flexible sealing layer portion thereon, while at the same time forming at least one sealing contour and at least two support elements. In another variant, two rigid sealing layer portions, which, may have previously been punched out, possibly also embossed, are provided in a first step by means of injection moulding with at least one sealing contour of their own and a section of the flexible sealing layer portion, hereinafter referred to as connector sections. In a second step of the variant, these two elements are then connected by means of injection moulding to the edges of the connector sections facing each other, with simultaneous formation of a connecting portion, at least one sealing contour and at least one support element. In an intermediate step, the edges of the connector section can be trimmed. In principle, at least one support element can also be formed in at least one connector section in this variant. In a third variant, deviating from the first variant, the sealing contour of the rigid sealing layer portions is moulded onto the rigid sealing layer portions together with the flexible sealing layer portions and continuous to the sealing contour(s) belonging to these portions and the at least two support elements. An all-round seal can thus be produced via a relatively large number of flexible sealing layer portions and optionally also a relatively large number of rigid sealing layer portions.

Here, advantages and advantageous embodiments of the method may correspond to advantages and advantageous embodiments of the described seal.

The features and feature combinations stated above in the description, including in the introductory part, and the features and feature combinations stated below in the description of the drawings and/or shown separately in the drawings can be used in combinations other than those stated in each case, without departing from the scope of the present disclosure. In this respect, the present disclosure should be considered to include and disclose embodiments that are not explicitly shown in the drawings or explained but which arise from and can be produced as a result of feature combinations separated out of the embodiments that are described. Embodiments and feature combinations that consequently do not contain all the features of an original independent claim should also be deemed disclosed. In addition, the present disclosure should be taken to disclose embodiments and feature combinations, including those resulting from the above-described embodiments, that either go beyond or deviate from the feature combinations stated in the back-references of the claims.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure or limited to subject matter described as advantageous.

BRIEF DESCRIPTION OF THE FIGURES

The subject matter according to the present disclosure will now be explained in more detail on the basis of the following drawings, but it is not intended to be limited to the specific embodiments shown therein.

FIGS. 3A-D show schematic views of a conventional seal without a support element and of a seal with a support element in the non-compressed and compressed state;

FIGS. 4A-B show respective sectional views with a sectional plane parallel to the main extension plane of the seal, with differently configured support elements;

FIGS. 6A-C show perspective views of the example embodiment of a seal of FIG. 5, with a sectional plane extending perpendicular to the main extension plane, in the non-folded state, as well as two variants thereof;

FIGS. 7A-C show different sectional views through different sectional planes with example embodiments of two support elements;

FIGS. 8A-D show different views of an example row of support elements;

FIGS. 9A-B show sectional views of non-compressed seals with example support elements, with a sectional plane perpendicular to the periphery direction; and FIG. 10 shows example characteristic curves for different seals in the form of line pressure in N/mm over profile height in mm.

FIGS. 1-9B are shown approximately to scale.

Figure 1:
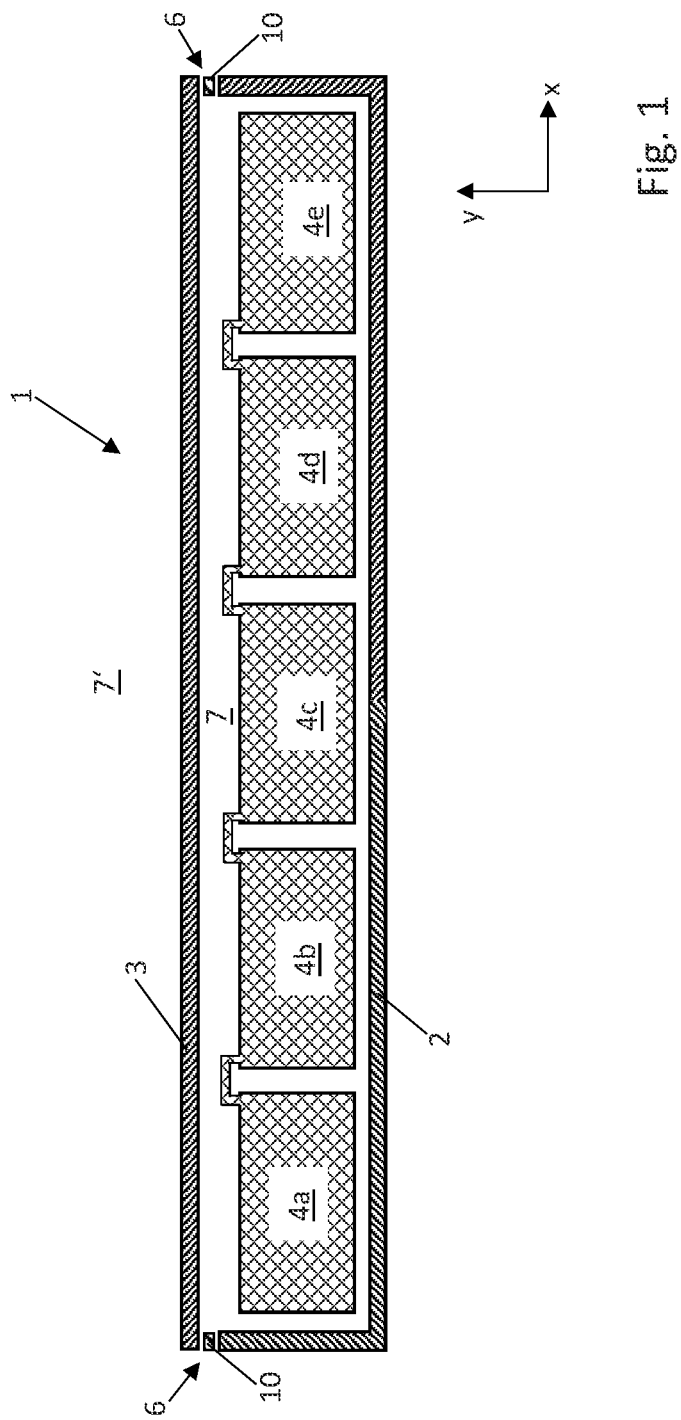
FIG. 1 shows an example housing having battery cell modules arranged therein and an example seal.

Like components or those with identical functions have been provided with the same reference signs in the drawings.

DETAILED DESCRIPTION

FIG. 1 shows a motor vehicle battery housing as an example housing 1 having, in the present case, battery modules 4a to 4e of a vehicle traction battery arranged therein. The housing 1 has a trough as a bottom part 2 and a lid as a top part 3. The battery modules 4a to 4e are housed in an inner chamber 7 of the housing 1. In this example, the housing 1 comprises a gap 6 (the gap 6 to be sealed) above the battery modules 4a to 4e between the bottom part 2 and the top part 3. Accordingly, in the present case, a seal 10 is placed in the gap 6 in order to seal it and thus seal the inner chamber 7 from an exterior 7' of the housing 1. For this purpose, in the present case, the seal 10 accordingly extends all around the inner chamber 7 of the housing 1 and, in the example shown, accordingly comprises an opening 13 (FIG. 2), which corresponds to the inner chamber 7 of the housing 1.

Figure 5:
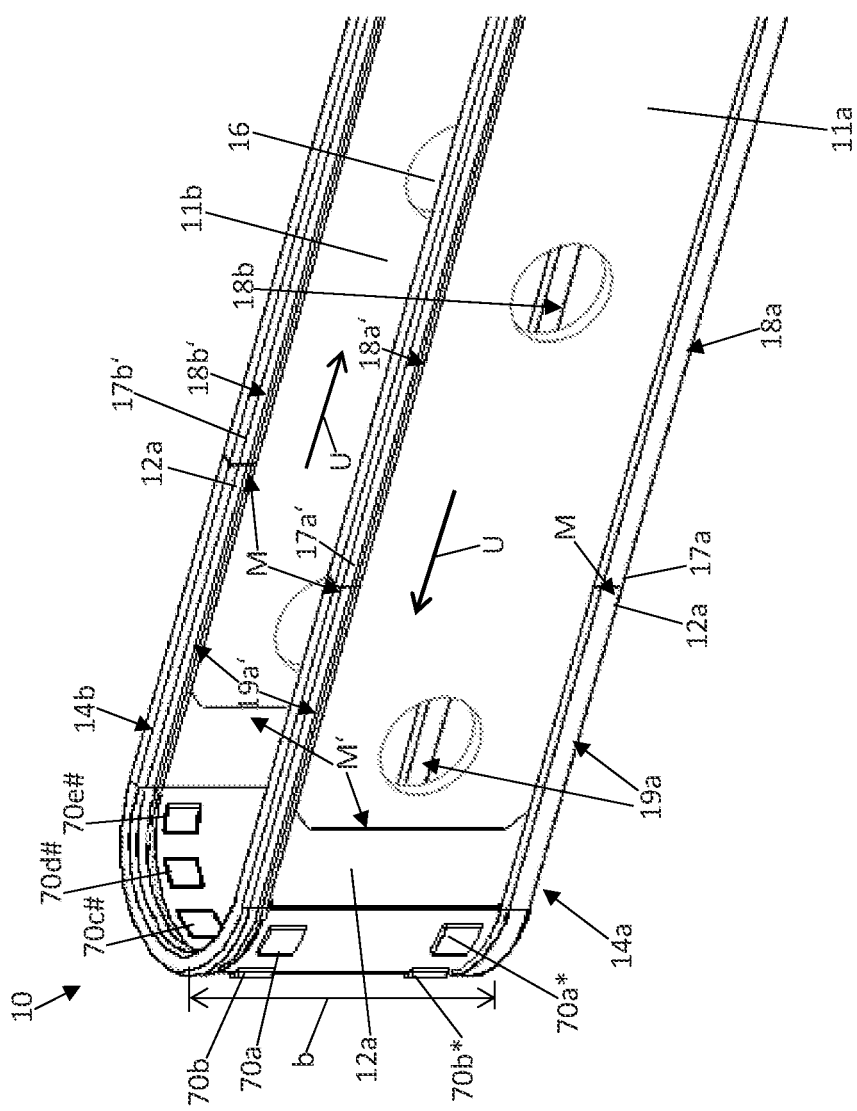
FIG. 5 shows a perspective view of a detail of an example embodiment of a seal in the folded state.

Housings 1 of this kind typically have dimensions of more than 1 m, at least in either the length or width direction or in both the length and width directions, such that the seal 10, which may be in the form of a gasket, typically has a length of several meters in a periphery direction U (FIG. 5).

Figure 2:
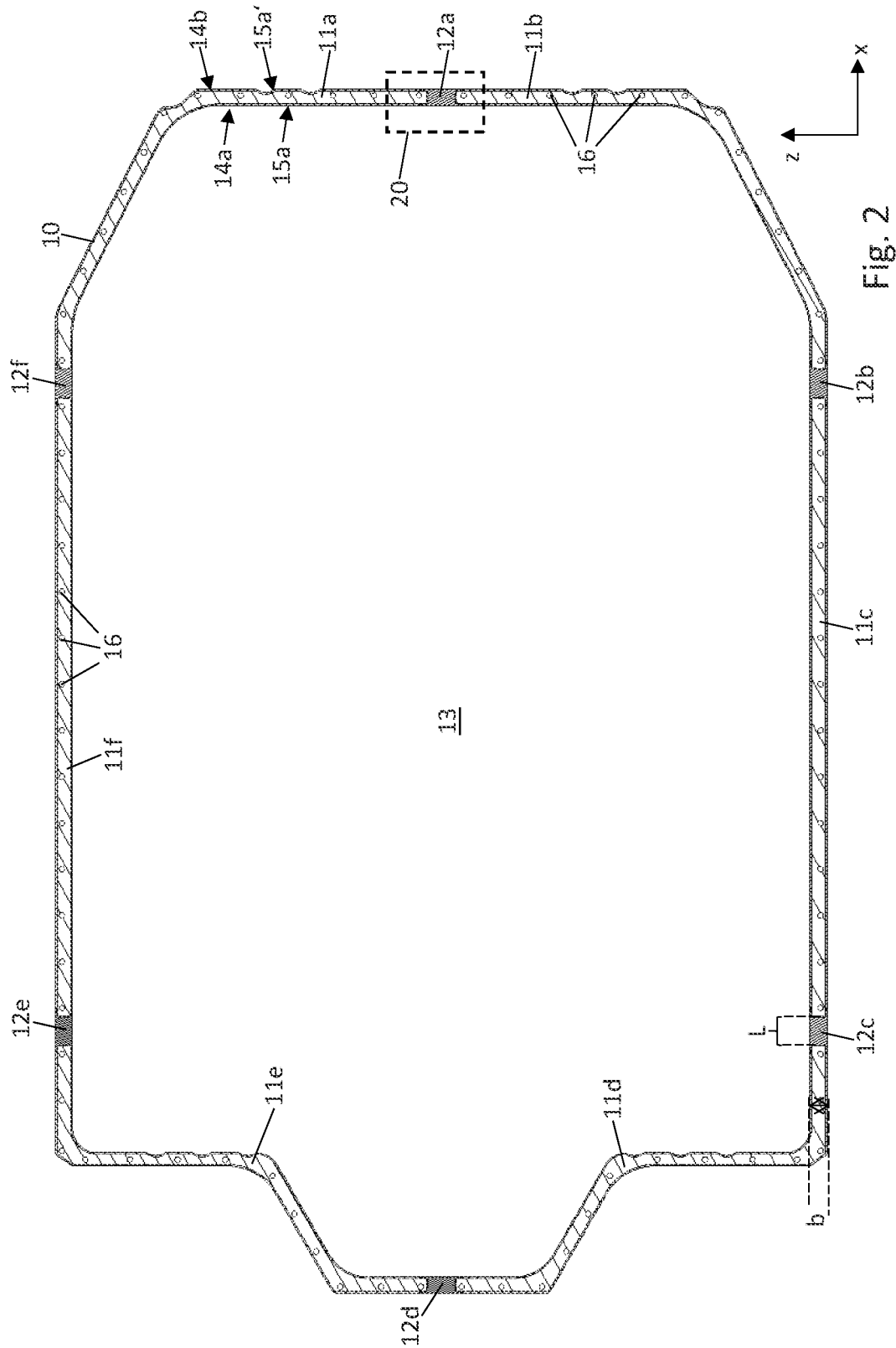
FIG. 2 shows an example embodiment of a seal in a sectional view with a sectional plane parallel to the main extension plane of the seal.

FIG. 2 shows a sectional view of an example embodiment of the seal 10, the sectional plane extending in parallel with a main extension plane (in this case the x-z plane) of the seal 10. This embodiment accordingly comprises N rigid sealing layer portions 11a to 11f and N flexible sealing layer portions 12a to 12f which connect the rigid sealing layer portions 11a to 11f, and which connect the respective rigid sealing layer portions 11a to 11f such that in each case two rigid sealing layer portions 11a, 11b are connected by one flexible sealing layer portion 12a. In the example shown, N=6. In the present case, a seal 10 having an opening 13 is accordingly formed by the identical number of rigid and flexible sealing layer portions 11a to 11f, 12a to 12f. A seal 10 of this kind can also be referred to as an annular seal 10. In the present case, the seal 10 comprises an uninterrupted sealing contour 14a at an inner edge 15a, 15b (FIG. 3A), facing towards the opening 13, of the rigid sealing layer portions 11a to 11f, and in the example shown also a further uninterrupted sealing contour 14b at an outer edge 15a', 15b' (FIG. 3A), facing away from the opening 13, of the seal 10. The properties of the uninterrupted sealing contours 14a, 14b of this example are explained more precisely by way of example in the following figures on the basis of the inner uninterrupted sealing contour 14a.

In this embodiment, the rigid sealing layer portions 11a to 11f also each comprise holes 16, which can be both positioning holes and screw holes, for corresponding securing means. These can be in the form of conventional round holes, as shown, but they can also have a special shape in order to improve the electromagnetic compatibility, for example such that they establish direct metal-metal contact with the fastener, for example a screw, when in the installed state owing to special rough areas on their surfaces or on their edges.

A width b of the seal 10 in the main extension plane is constant in many regions. At the transition from a rigid sealing layer portion 11a to 11f to a flexible sealing layer portion 12a to 12f adjoining the rigid sealing layer portion 11a to 11f, there may be no significant change to the width b of the seal 10. The width b may change by less than 5% at a transition from a rigid sealing layer portion 11a to 11f to a flexible sealing layer portion 12a to 12f.

Example advantages and differences of seals with support elements compared to seals without support elements will be explained on the basis of FIGS. 3A-D. Although all the rigid sealing layer portions are shown as single-layer in FIGS. 3A-D and the subsequent figures, it is in principle possible that these comprise or consist of at least two layers arranged one above the other.

FIG. 3A shows a schematic sectional view, transversely to the periphery direction U (FIG. 5), through a flexible sealing layer portion 12a with a sealing contour 14a, 19a for a conventional seal 10. In the example shown, the sealing contour 14a, 19a internally seals the inner chamber 7 from the exterior (not shown). Here, even in the non-compressed state, a sealing lip 60a of the sealing contour 14a, 19a bears against the corresponding housing part, here the housing lid 3, over a width b*. This also applies analogously to a further sealing lip 60a* of the sealing contour 14a, 19a, which bears against the counterpart to the first part, in the present case the housing trough 2. Hereinbelow, reference will be made by way of example to the sealing lip 60a on one side, in the present case the upper side of the seal 10, which is oriented in the positive y-direction. The seals 10 described here and below may have such sealing lips or sealing contours on one side or on both sides, on an upper side oriented in the positive y-direction and/or on a lower side oriented in the negative y-direction.

In FIG. 3B, the seal 10 of FIG. 3A is now shown in a compressed state. As a result of the compression, the height of the gap 6 in the y-direction is reduced, and the effective bearing width b* of the sealing lip 60a is increased. In conventional seals, the effective bearing width b* is smaller in the flexible sealing layer portion 12a than in a rigid sealing layer portion (not shown).

FIG. 3C shows a flexible sealing layer portion 12a of the seal 10 with two support elements 70a, 70a*. The support elements 70, 70a* are assigned to the sealing contour 14a, 19a, the upper-side and lower-side sealing lip 60a, 60a* of which are respectively arranged closely adjacent to the corresponding support element 70a, 70a* on the upper side or lower side of the flexible sealing layer portion 12a. In the non-compressed state shown here, both the sealing lips 60a, 60a* and the support elements 70a, 70a* bear against the respective housing parts, for example the housing lid 3 and the housing trough 2, over a respective effective sealing lip width b* and effective support element width c*. In the example shown, therefore, the lip height 1 of the sealing contour 14a, 19a is equal to the support element height s of the support elements 70a, 70a*.

In the compressed state of the flexible sealing layer portion 12a with the support elements 70a, 70a*, which is shown in FIG. 3D, not only does the respective support element 70a, 70a* bear against the corresponding housing parts 3, 2 over a larger effective support element width c*, but also the effective sealing lip width b* of the sealing contour 14a, 19a or of the sealing lip 60a has increased compared to FIG. 3B, in the example shown by around 7%. In this case, the function of the support element 70a is not to seal the gap 6, but rather to support the sealing contour 14a, 19a, which prevents the flexible sealing layer portion 12a, which may for example be made of an elastomer, from yielding in the region of the sealing lip 60a in the direction of the seal 10, for example in the present case in the positive x-direction, thereby reducing a contact pressure of the sealing lip 60a against the housing part 3.

FIG. 4A shows a detail 20 from FIG. 2. Here, the two rigid sealing layer portions 11a, 11b comprise the inner edges 15a, 15b and the outer edges 15a', 15b', as well as the end-side edges 15a", 15b", which are oriented in opposite directions to one another. A flexible sealing layer portion 12a, which in the present case is formed of an elastomer, is arranged between the end edges 15a", 15b" and interconnects the two rigid sealing layer portions 11a, 11b. In the present case, the two rigid sealing layer portions 11a, 11b each comprise two sealing soft components 17a, 17a' and 17b, 17b', respectively. In the present case, the inner sealing soft components 17a, 17b form an inner partial sealing contour 18a, 18b of the continuous inner sealing contour 14a, and the outer sealing soft components 17a', 17b' form respective outer partial sealing contours 18a', 18b' of the outer continuous sealing contour 14b. In the present case, the connecting flexible sealing layer portion 12a accordingly forms an inner partial sealing contour 19a and an outer partial sealing contour 19a', which, together with the inner and outer partial sealing contours 18a, 18b, 18a', 18b', form the inner and outer continuous sealing contour 14a, 14b. In the present case, the length L of the connecting flexible sealing layer portion 12a denotes the length over which the flexible sealing layer portion 12a connects by its elastomer the two rigid sealing layer portions 11a, 11b between the end-side edges 15a", 15b" thereof. In this example, the length L thus does not extend into the regions in which the partial sealing contours 19a, 19a' of the flexible sealing layer portion 12a are arranged adjacent to the edges of the rigid sealing layer portions 11a, 11b, or the rigid sealing layer portions 11a, 11b are overmoulded with the elastomer of the flexible sealing layer portion 12a.

The inner partial sealing contours 18a, 18b, 19a, together with the corresponding partial sealing contours of the other sealing layer portions 11c-11f of FIGS. 2 and 12b-12f of FIG. 2, form the inner uninterrupted sealing contour 14a. Correspondingly, the outer parts of the sealing contours 18a', 19a' and 18b', together with the partial sealing contours of the further sealing layer portions 11c-11f, 12b-12f, form the outer sealing contour 14b. In the example shown, the illustrated detail 20 accordingly also depicts, mutatis mutandis, the other rigid sealing layer portions 11c-11f together with the associated connecting flexible sealing layer portions 12b-12f.

In the present case, the sealing soft components 17a, 17a', 17b, 17b' are moulded onto the corresponding inner edges 15a, 15b and outer edges 15a', 15b' of the respective rigid sealing layer portions 11a, 11b. In this embodiment, the sealing soft components 17a, 17a', 17b, 17b' are moulded thereon along the edges 15a, 15a', 15b, 15b' only over a respective sub-portion 21a, 21b of the respective rigid sealing layer portion 11a, 11b, for example the sealing soft components 17a, 17a', 17b, 17b' do not extend fully along the respective edges 15a, 15a', 15b, 15b'. Instead, in the present case, the elastomer of the flexible sealing layer portion 12a is moulded directly onto the remaining end portions 22a, 22b (not covered by the sealing soft components 17a, 17a', 17b, 17b') of the rigid sealing layer portions 11a, 11b and in the present case is also moulded directly onto the end edges 15a", 15b" and forms the sealing contour there. The elastomer of the flexible sealing layer portions 12a thus encompasses the respective rigid sealing layer portions 11a, 11b in the main extension plane of the seal 10, the x-z plane, and is held well on the rigid sealing layer portion 11a, 11b. In the example shown, the sealing soft components 17a, 17a', 17b, 17b' merge not abruptly, but instead smoothly, into the elastomer of the flexible sealing portion 12a in the periphery direction U, for example in the present case in the z-direction, that is to say perpendicularly to the z-direction. This leads to an improved uninterrupted sealing contour 14a, 14b.

Also shown in the present case are two support elements 70a, 70a* of the flexible sealing layer portion 12a. In the present case, these are arranged on the upper side, oriented in the positive y-direction, and/or on the lower side, oriented in the negative y-direction, of the flexible sealing layer portion 12a, for example in each case on the side of the flexible sealing layer portion 12a on which the associated sealing contour 14a, 19a, 14a', 19a', which is to be supported and stabilized by the respective support elements 70a, 70a*, or the respective sealing lip(s) thereof are arranged. Here, the support elements 70a, 70a* are arranged between the sealing contours 19a, 19a'. In the example shown, they have an ellipsoidal cross-section in the x-z plane, wherein in the present case the main axis extends transversely to the periphery direction, for example in the x-direction. Therefore, in a way that is easy to produce, the end regions of the support elements 70a, 70a* belonging to the vertices of the main axis can be used to stabilize the regions of the respective sealing contour 19a, 19a' closely adjacent thereto. Due to the orientation of the main axis parallel to the x-direction, a folding of the seal 10 out of the plane of the drawing is not hindered by the support elements 70a, 70a*, since a thickness of the flexible sealing layer portion 12a in the area around the support elements 70a, 70a* is not changed.

FIG. 4B shows, in a manner analogous to FIG. 4A, a further example embodiment in which, in addition to the support elements 70a, 70a*, also the end regions 22a, 22a', 22b, the end edges 15a", 15b" and the sealing contour 14a, 14b have been varied. The variations shown can also take place independently of each other.

It should first be noted here that the sealing contour 14a and the sealing contour 14b in the present case, compared to the example shown in FIG. 4A, have a different width in the main extension plane. In the example shown, therefore, the inner sealing contour 14a has a larger width than the outer sealing contour 14b, which brings advantages in many use scenarios. This can also be combined with end regions 22a, 22a', 22b of different size, as is the case here. For example, the outer end region 22a' has a shorter length than the inner end region 22a. In this embodiment, the respective associated end-side edge 15a", 15b" of the rigid sealing layer portion 11a, 11b may have only a generally roughened structure, as is the case for the end-side edge 15a" shown on the left in the figure, or else may be specifically structured to improve the engagement of the elastomer of the flexible sealing layer portion 12a in the associated end region, as is the case for example on the end-side edge 15b" in the end region 22b, in which a stable attachment of the flexible sealing layer portion 12a to the rigid sealing layer portion 11b is achieved by a design with respective undercuts, as known from the dovetailing of wood.

Independently of the aforementioned differences compared to the example shown in FIG. 4A, the support elements are also configured differently in the present case. For instance, the flexible sealing layer portion 12a in the present case has a plurality of support elements 70a-70f, 70a*-70f*, which in the present case are arranged in two rows along the sealing layer 19a' and 19a. Here, the row having a first set of six support elements 70a-70f is assigned to the sealing contour 19a, that is to say is arranged here closely adjacent to this sealing contour 19a, and due to the distance therefrom is suitable for supporting these when used as intended, and a second set of support elements 70a*-70f* is arranged in a row along the inner sealing contour 19a', the latter row extending parallel to the sealing contour 19a'. In the present case, the support elements 70a*-70f* of the further row have for example a homogeneous distribution in terms of the distances from the respective closely adjacent support element, the length of the support elements measured along the course of the sealing contour 19a, and the width of the support elements 70a*-70f* measured transversely to the course of the sealing contour.

In contrast, the row of support elements 70a-70f assigned to the outer sealing contour 19a, which otherwise has properties corresponding to the further row, has an inhomogeneous distribution of the width, measured transversely to the course of the sealing contour, and consequently an inhomogeneous distance from the outer sealing contour 19a'. In the present case, the support elements 70d, 70c arranged furthest from the respective inner edges 15a", 15b" have the largest width and thus the smallest distance from the outer sealing contour 19a', and the support elements 70a, 70f arranged closest to the end-side edges 15a", 15b" have the smallest width and thus the greatest distance from the outer sealing contour 19a'. Support elements 70b, 70e located therebetween have corresponding intermediate values, so as to achieve the smoothest possible transition. As a result, the sealing contour 19a' in the central region of the flexible sealing layer portion 12a, located furthest from the end-side edges 15a", 15b", is most strongly supported by the support elements 70c, 70d, and a corresponding bending in the flexible sealing layer portion 12a is hindered as little as possible.

FIG. 5 shows an example perspective view of the described seal 10 in an example folded or bent state. It can be seen clearly here that a material transition M between the sealing soft components 17a, 17a', 17b' and the elastomer of the flexible sealing layer portion 12a extends transversely to the course direction U of the seal 10 and, in the example shown, is offset in the course direction U from a further material transition M' between the elastomer of the flexible sealing layer portion 12a and the rigid sealing layer portions 11a, 11b on the respective end-side edge 15a", 15b". The further material transition M' likewise extends transversely to the course direction U, at least over a large part of the width b of the seal 10.

A plurality of support elements 70a, 70b, 70c#, 70d#, 70e#, 70a*, 70b* are arranged on the flexible sealing layer portion 12a. In the present case, these are arranged in different rows on different sides of the seal 10 and closely adjacent to different edges of the seal 10. For instance, the support elements 70a*, 70b* are arranged as part of a row that extends along the inner, in the figure lower, sealing contour 14a. The support elements 70a, 70b and respectively 70c#, 70d# and 70e# are arranged in respective rows along the outer sealing contour 14b, in the figure the upper sealing contour. In addition, according to the bending radius shown, the support elements 70a, 70b of the first outer row are in the present case formed on the outside of the flexible sealing layer portion 12a, and the support elements 70c#, 70d#, 70e# are correspondingly formed in a manner symmetrical thereto on the inside of the flexible sealing layer portion 12a. The support elements 70a, 70b, 70a*, 70b*, 70c#, 70d#, 70e# can thus be provided on the respective flexible sealing layer portions 12a-12f regardless of a folding or bending of the seal 10, without adversely affecting the bendability. The reinforcement on two sides as shown, in which the respective support elements 70a, 70b, 70c#, 70d#, 70e# are arranged symmetrically in relation to a plane of symmetry that extends parallel to the main extension plane of the seal 10, can be advantageous.

FIG. 6A shows a perspective sectional view of the seal 10. The sectional plane extends perpendicularly to the main extension plane of the seal, for example perpendicularly to the x-z plane, and perpendicularly to the course direction U of the seal 10. As before, in order to improve the connection to the sealing soft component 17a, which forms the partial sealing contour 18a, the elastomer of the flexible sealing layer portion 12a is moulded onto the sealing soft component 17a and forms the partial sealing contour 19a thereon. Accordingly, the sealing soft component 17a is no longer visible from outside downstream of the visible material transition M in the course direction U, but it continues below the elastomer of the flexible sealing layer portion 12a in the direction of the end edge 15a" of the rigid sealing layer portion 11a, which may improve service life and sealing performance. A transition of this kind is possible not only when the sealing contour 14a has a double profile, as shown here, but also when the sealing contour 14a has a single profile, which has just one single sealing lip, or when the sealing contour 14a has a profile in another form. Only the flexible sealing layer portion 12a can be seen on the section face in this embodiment, and therefore in the present case the seal 10 in the region of the partial sealing contour 19a is formed entirely by the elastomer of the flexible sealing layer portion 12a.

Here again, a row of support elements 70a-70c is assigned to the partial sealing contour 19a and thus to the sealing contour 14a in the region of the flexible sealing layer portion 12a, on the side facing towards the viewer. In contrast to the example shown in FIG. 5, in the present case at least one row of support elements 70a-70c is present on the flexible sealing layer portion 12a on just one surface. In the example shown, the support elements 70a-70c have a square cross-section in the main extension plane of the seal 10, for example a square base surface. The thickness of the flexible sealing layer portion 12a in the region of the support elements 70a-70c results from the thickness d of the flexible sealing layer portion 12a in an area around the respective support elements 70a-70c plus the support element height s. In the region of the sealing contour 14a, the thickness of the flexible sealing layer portion 12a accordingly results from the thickness d of the flexible sealing layer portion 12a in an area around the sealing contour 14a and the lip thickness 1.

FIGS. 6B and 6C each show a corresponding variant, in which the flexible sealing layer portion 12a is manufactured in several parts with a connector section 121a and a connecting portion 120a, which can be injection-moulded one behind the other. The connector section facing the next rigid sealing layer portion 11b is not visible in the detail shown. The material edge M runs here essentially in a straight line and perpendicular to the periphery direction U from a sealing contour 14a to the sealing contour 14a' not shown. This embodiment can be advantageous with respect to the formation of the flexible sealing layer portions or the connection of the entire flexible sealing layer portion to the adjacent rigid sealing layer portions. Alternatively to the shown rectilinear-vertical course, other courses of the material edge are also possible, for example wave-shaped and/or oblique. FIGS. 6B and 6C differ in that in the example of FIG. 6B a support element 70a is also formed in the connector section 121a. In the example of FIG. 6C, on the other hand, support elements 70b, 70c are formed only in the connecting portion 120a in this embodiment. In addition to the two variants shown, it would also be possible to form a support element in such a way that it is formed partly in the region of the connector section 121a and partly in the connecting portion 120a, for example the support element is intersected by the material edge M. In a further variant not shown here, the entire flexible sealing layer portion 12a can be moulded together with a continuous sealing contour 14a, which also surrounds the rigid sealing layer portions 11a, 11b, and the support elements 70a, 70b, 70c, resulting in a representation in this embodiment of FIG. 6A, in which only the material edge M is missing and thus a distinction between partial sealing contours 18a and 19a is no longer possible.

In a manner analogous to FIGS. 4A and 4B, an example shape of the support elements is shown in FIGS. 7A-C.

FIG. 7A once again shows a sectional view with a sectional plane in the main extension plane of the seal 10; once again, the flexible sealing layer portion 12a is arranged between the end-side edges 15a", 15b" of the rigid sealing layer portions 11a, 11b. In the example shown, two support elements 70a, 70a* are shown in the flexible sealing layer portion 12a, the two support elements extending parallel to the sealing lip 14b and 14a, respectively. Here, the first support element 70a is closely adjacent to the outer sealing contour 14b, and the second support element 70a* is closely adjacent to the inner sealing contour 14a. In the present case, the support elements 70a, 70a* have an elongated profile in the x-z plane and extend parallel to the periphery direction and thus parallel to the respective sealing contour 14a, 14b. The length of the support elements 70a, 70a* in the periphery direction U of the support elements 70a, 70a* is thus a multiple of, for example more than ten times, a width of the support elements 70a, 70a* transversely to the periphery direction U.

In FIG. 7B, which shows a sectional view along the section A-A shown in FIG. 7A, an example height shape of the support elements is shown, in the present case of the support element 70a*. Here, the surface of the support element 70a* extends convexly in each case in the periphery direction U in two adjoining regions, with a shorter concave region being provided in the middle. Since the support element 70a is supplemented by a symmetrical counterpart on the other side of the seal 10, in FIG. 7A on the rear side and in the present case on the lower side oriented in the negative y-direction, the respective convex portions correspond to a constriction in the height profile of the respective support elements 70a*. In the present case, a reinforcing element V made of a different rubber material than the elastomer G of the flexible sealing layer portion 12a is arranged in the interior of the support elements. This counteracts a deformation of the support element 70a* (and of the counterpart on the other, lower side).

FIG. 7C shows the section along the section B-B indicated in FIG. 7A. While in the sectional view shown in FIG. 7B the described profile is mirror-symmetrical, in the present case it is non-symmetrical. The transition between the sealing profile 14b and the support element 70a is higher, for example the flexible sealing layer portion has a greater thickness, between the sealing profile 14b and the support element 70a than between the sealing profile 14a and the support element 70a*. As a result, when used as intended, the sealing profile 14b is deformed to a lesser extent than the sealing element 14a, and therefore a folding or bending of the flexible sealing layer portion 12a is not hindered or not significantly hindered. The reinforcing elements V arranged exclusively in the region of the support elements 70a, 70a* are also shown.

FIGS. 8A-D once again illustrate the properties of an example variant of the support elements 70a-70f. In this case, the corresponding support elements 70a-70f are arranged in a row, as shown in FIG. 8A, and are provided with a substantially circular base surface.

It can be seen from FIG. 8B that these support elements 70a-70f taper conically in the upward direction, for example in a vertical direction or y-direction. This can have advantage that, as shown in FIGS. 8C and 8D, during a corresponding bending, be it with a larger radius (FIG. 8C) or a smaller radius (FIG. 8D), less force is required and the stabilizing effect of the support elements 70a-70f on the respectively associated sealing contour 14a, 14b (FIG. 7A) is combined with a large degree of flexibility of the flexible sealing layer portion 12a during bending or folding. In the example shown, the row of support elements 70a-70f is arranged on just one side of the flexible sealing layer portion 12a, namely in the present case on the inner side with regard to the bending. However, the flexible sealing layer portion 12a could just as well be bent in the opposite direction, so that the row of support elements 70a-70f would be arranged on the outer side and could combine the same advantages. As already explained above, such rows of support elements can also be arranged on both sides of the flexible sealing layer portion 12a, for example in order to support different sealing layers or sealing lips on the upper side and lower side of a seal in the region of the flexible sealing layer portion 12a. The different curvature in FIGS. 8C and 8D may be caused, for example, by a different design of the sealing contours; for example, the adjacent sealing contour may be stiffer in FIG. 8C than in FIG. 8D. As an alternative or in addition, it is possible that the support element in the two embodiments is made of material of different stiffness.

FIGS. 9A-B show a respective seal 10 with support elements 70a, 70a* in a gap 6. The seal 10 is in each case installed with two sealing contours 14a, 14b in the gap 6 between the lid 3 and the trough 2. Here, the support element 70a is assigned to the outer sealing contour 14b, and the support element 70a* is assigned to the inner sealing contour 14a. In FIG. 9A, the height s of the support elements 70a, 70a* corresponds to the sealing lip height 1 of the corresponding sealing contours 14a and 14b. In FIG. 9B, the height s of the support elements 70a, 70a* is smaller than the sealing lip height 1 of the sealing contours 14a, 14b. Accordingly, FIG. 9A can be associated with curve D in FIG. 10, and FIG. 9B can be associated with curves A, B, C in FIG. 10.

FIG. 10 shows the line pressure, for example the effective pressure on a sealing lip of the respective sealing contour 14a, 14b, over the actual profile height in the installed state for a seal 10, the rigid sealing layer portions 11a, 11b of which have support elements with a thickness of 2.5 mm.

Curve A shows the curve of the line pressure over the profile height for a sealing contour with a sealing lip height 1 of 0.6 mm without support elements in the flexible sealing layer portion 12a. When fully compressed to a profile height of 2.5 mm, the achievable line pressure is at a value of around 1.6 N/mm and thus significantly below the line pressures of around 1.9 N/mm that can be achieved in the region of the rigid sealing layer portions 11a, 11b with a support element. If corresponding support elements 70a, 70a* that have a height s of 0.05 mm (for example a 0.1 mm projection as the sum of both surfaces) are arranged in the region of the flexible sealing layer portion, the achievable line pressure already noticeably increases, as can be seen from curve B. If the support element height s is further increased on both sides, namely to 0.15 mm (curve C) or 0.3 mm (curve D), so that the total projection is 0.3 mm (curve C) or 0.6 mm (curve D), the achievable line pressure in the region of the corresponding supported sealing contour 14a, 14b again sharply increases to around 1.8 and 1.85 N/mm, respectively, as shown in the figure.

The behavior of the respective seal 10 with support elements 70a, 70a* characteristically changes during the compression in each case exactly at the points P, at which the compressed profile height in the region of the sealing contour 14a, 14b reaches the support element height s. The support elements 70a, 70a* thus begin to act at the very moment at which they make contact with the corresponding housing parts 2, 3. After contact has been established between the support element 70a, 70a* and the corresponding housing part 2, 3 during the compression, the further pressure curve proceeds substantially identically to that in the rigid sealing layer portions 11a, 11b, which is shown in curve E. Therefore, despite the use of a soft component such as, for example, the elastomer with or without a reinforcing element V, the support elements 70a, 70a* in the flexible sealing layer portion 12a make it possible to achieve a behavior that is very similar to the sealing contour 14a, 14b in the rigid sealing layer portion 11a, 11b, for instance achieving a line pressure of similar magnitude.

FIGS. 1-9B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A seal for sealing an inner chamber of a housing from an exterior of the housing, the housing for a motor vehicle battery or a motor vehicle battery box, the seal extending in a course around the inner chamber and a width of the seal extending between the inner chamber and the exterior of the housing, the seal comprising at least one sealing layer comprising:
   at least two rigid sealing layer portions extending in the course of the seal;
   one flexible sealing layer portion comprising an elastomeric material and having a length such that the seal is foldable at the one flexible sealing layer portion, in a folded state the one flexible sealing layer portion forming an arch-shape and one of the two rigid sealing layer portions is folded over into a position such that a face of the one of the two rigid sealing layer portions faces a corresponding face of another of the two rigid sealing layer portions, the one flexible sealing layer portion connecting the two rigid sealing layer portions in the course of the seal, and the flexible sealing layer portion having a thickness; and
   at least one sealing contour, which extends along an edge of the at least two rigid sealing layer portions and the flexible sealing layer portion such that the sealing contour is injection molded to the at least two rigid sealing layer portions;
   wherein the flexible sealing layer portion has at least two support elements which have a thickness that is greater than the thickness of the flexible sealing layer portion surrounding the support elements when the thickness of the flexible sealing layer portion is in an uncompressed state, the thickness being perpendicular to the course and the width of the seal, and the support elements are arranged such that the at least one sealing contour in the flexible sealing layer portion is arranged between the support elements and the inner chamber and/or between the support elements and the exterior in a direction of the width of the seal.

2. The seal according to claim 1, wherein the rigid sealing layer portions are foldably interconnected by the flexible sealing layer portion.

3. The seal according to claim 1, wherein at least two sealing contours are present, and at least one of the at least two support elements is assigned to each of the sealing contours.

4. The seal according to claim 1, wherein the support elements and/or the at least one sealing contour in a region of the flexible sealing layer portion are formed in one piece with at least part of the flexible sealing layer portion, from an elastomer.

5. The seal according to claim 1, wherein a height of the support elements, measured perpendicularly to a main extension plane of the seal, is at least 45% of the height of the sealing contour.

6. The seal according to claim 1, wherein the support elements are arranged in at least one row, which extends adjacent to or parallel to at least one sealing contour.

7. The seal according to claim 1, wherein the support elements are configured to be one or more of: stiffer than the sealing contour in a direction perpendicular to a course of the sealing contour, and a width of the sealing contour being greater than a width of the support elements, measured perpendicularly to the thickness and the course of the sealing contour.

8. The seal according to claim 1, wherein the support elements each have an inhomogeneous distribution of one or more of: the height, measured perpendicularly to a main extension plane of the seal, the width, measured in the main extension plane of the seal transversely to the course of the sealing contour, a length, measured in the main extension plane of the seal along the course of the sealing contour, or a distance from the respective closely adjacent support element, measured in the main extension plane of the seal along the course of the sealing contour.

9. The seal according to claim 1, wherein the flexible sealing layer portion in a region of the support element comprises at least two different components, and/or
   a core of the support element has a component that is firmer than the rest of the support element.

10. A housing for a motor vehicle battery or motor vehicle battery box, having a seal according to claim 1.

11. A method of manufacturing a seal according to claim 1, comprising:
    the respective rigid sealing layer portions being manufactured independently of each other in a first manufacturing step, and
    in one or more second manufacturing steps, each two rigid sealing layer portions being joined by at least one connecting flexible sealing layer portion.

12. The method according to claim 11, wherein, in the second manufacturing step, two rigid sealing layer portions, which in the first manufacturing step were each provided at least in part with at least one sealing contour of their own by injection molding, are joined by injection molding of the flexible sealing layer portion with simultaneous formation of at least one sealing contour and at least two support elements.

13. The method according to claim 11, wherein, in the first manufacturing step, at least two rigid sealing layer portions are manufactured by injection molding both with at least one own sealing contour and with a section of the flexible sealing layer portion as respective connector section, and in the second manufacturing step, the two rigid sealing layer portions provided with the connector sections are then connected by injection molding to edges of the connector sections facing each other with simultaneous formation of a connecting portion, at least one sealing contour, and at least one supporting element.

14. The method according to claim 13, wherein, before joining the two rigid sealing layer portions provided with the connector sections by gating, at least one edge of each connecting portion is trimmed.

15. The method according to claim 11, wherein, in the second manufacturing step, at least one sealing contour of the rigid sealing layer portions is molded to the rigid sealing layer portions together with the at least one flexible sealing layer portion and continuous with respective sealing contours belonging to the different flexible sealing layer portions and with at least two supporting elements.

16. The seal according to claim 1, wherein, in a cross-section of the flexible sealing layer portion passing through the at least two support elements, the flexible sealing layer does not include internal cavities.

17. The seal according to claim 1, wherein at least one of the at least two support elements is positioned near the at least one sealing contour such that during compression the at least one of the at least two support elements supports the flexible sealing layer portion and prevents yield of the at least one sealing contour.

18. The seal according to claim 1, wherein a height of a lip of the sealing contour corresponds to a height of the at least two support elements.

19. The seal according to claim 1, wherein at least one section of the sealing contour and the flexible sealing layer portion are formed as a single, integral piece.

20. The seal according to claim 1, wherein the sealing contour extends along an inward facing edge of each of the at least two rigid sealing layers and an inward facing side of the flexible sealing layer portion.

* * * * *